US012791488B2

(12) United States Patent
Laplatine et al.

(10) Patent No.: US 12,791,488 B2
(45) Date of Patent: Nov. 10, 2026

(54) INTERFEROMETRIC ANALYTE DETECTION SYSTEM INCLUDING A MACH-ZEHNDER INTERFEROMETER ARRAY

(71) Applicants: COMMISSARIAT À L'ÉNERGIE ATOMIQUE ET AUX ÉNERGIES ALTERNATIVES, Paris (FR); ARYBALLE, Grenoble (FR)

(72) Inventors: Loic Laplatine, Grenoble (FR); Cyril Herrier, Grenoble (FR); Thierry Livache, Grenoble (FR)

(73) Assignees: COMMISSARIAT À L'ENERGIE ATOMIQUE ET AUX ÉNERGIES ALTERNATIVES, Paris (FR); ARYBALLE, Grenoble (FR)

(*) Notice: Subject to any disclaimer, the term of this patent is extended or adjusted under 35 U.S.C. 154(b) by 283 days.

(21) Appl. No.: 18/568,555

(22) PCT Filed: Jun. 6, 2022

(86) PCT No.: PCT/EP2022/065307
§ 371 (c)(1),
(2) Date: Dec. 8, 2023

(87) PCT Pub. No.: WO2022/258559
PCT Pub. Date: Dec. 15, 2022

(65) Prior Publication Data

US 2024/0280495 A1 Aug. 22, 2024

(30) Foreign Application Priority Data

Jun. 10, 2021 (FR) ...................................... 2106153
Jul. 28, 2021 (FR) ...................................... 2108208

(51) Int. Cl.
*G01N 21/77* (2006.01)
*G01N 21/25* (2006.01)

(52) U.S. Cl.
CPC ....... *G01N 21/7703* (2013.01); *G01N 21/253* (2013.01); *G01N 2021/7779* (2013.01)

(58) Field of Classification Search
CPC .... G02F 1/212; G01N 21/45; G01N 21/7703; G01N 21/253; G01N 2021/7779;
(Continued)

(56) References Cited

U.S. PATENT DOCUMENTS

2006/0165342 A1 7/2006 Pau et al.
2010/0165351 A1* 7/2010 Xu .................... G02B 6/12007 356/477

(Continued)

FOREIGN PATENT DOCUMENTS

CA 2072998 C * 2/2003 ............. G02B 6/122
EP 3 754 326 A1 12/2020

(Continued)

OTHER PUBLICATIONS

A. Densmore, et al., "Silicon photonic wire biosensor array for multiplexed real-time and label-free molecular detection", Optics Letters, Optical Society of America, US, vol. 34, No. 23, Dec. 1, 2009, pp. 3598-3600.

(Continued)

*Primary Examiner* — Thomas A Hollweg
*Assistant Examiner* — Kirsten D. Endresen
(74) *Attorney, Agent, or Firm* — McDonald Hopkins LLC

(57) ABSTRACT

An interferometric system for detecting analytes present in a fluid sample, including: an array of Mach-Zehnder interferometers arranged periodically and rectangularly whose arms extend in a spiral and/or serpentine fashion with an aspect ratio equal to 1; and an array of sensitive surfaces (Continued)

each formed of receptors with which the analytes are able to interact by adsorption/desorption and arranged periodically and hexagonally.

10 Claims, 6 Drawing Sheets

(58) Field of Classification Search
CPC ..... G01N 2021/7709; G01N 2021/458; G01N 2201/08
See application file for complete search history.

(56) References Cited

U.S. PATENT DOCUMENTS

2020/0400883 A1* 12/2020 Laplatine ............... G01N 21/41
2024/0210434 A1* 6/2024 Dubrovsky ........ G01N 35/1074

FOREIGN PATENT DOCUMENTS

WO WO-2011157766 A1 * 12/2011 ............. G01N 21/00
WO WO-2021207699 A1 * 10/2021 ......... G01N 35/0099

OTHER PUBLICATIONS

International Search Report dated Sep. 2, 2022 issued in PCT/EP2022/065307.
Written Opinion dated Sep. 2, 2022 issued in PCT/EP2022/065307.

* cited by examiner

INTERFEROMETRIC ANALYTE DETECTION SYSTEM INCLUDING A MACH-ZEHNDER INTERFEROMETER ARRAY

TECHNICAL FIELD

The field of the invention is that of the detection and characterization of analytes present in a fluid sample by means of an interferometric detection system including a Mach-Zehnder interferometer array.

PRIOR ART

The ability to detect and characterize analytes contained in fluid samples, for example odorous molecules or volatile organic compounds, is an increasingly significant problem, in particular in the fields of healthcare, agri-food industry, perfumery industry (scents), olfactory comfort in public or private confined spaces (motor vehicles, hotels, co-habitated locations, etc.), etc. the detection and characterization of such analytes present in a fluid sample may be performed by an interferometric detection and characterization system. This sample may be gaseous or liquid.

There are different characterization approaches, which are distinguished from one another in particular by the necessity, or not, of having to "label" the analytes or the receptors beforehand with a revealing agent. Unlike for example fluorescence detection which requires resorting to such labels, detection using surface plasmon resonance (SPR), and that using a Mach-Zehnder type (MZI) interferometric technology are known as label-free techniques.

To the extent that the chemical or physical affinity of interaction of the analytes with the receptors is not known a priori, the characterization of the analytes then amounts to determining a value or a variation of a parameter representative of the adsorption/desorption interactions of the analytes with the receptors, herein representative of the variation over time of the local refractive index for each of the sensitive surfaces. Thus, an interaction pattern, or a signature, which characterizes the analytes, is obtained. Indeed, the interactions of adsorption/desorption of the analytes on sensitive surfaces (functionalized surfaces) benefiting from differentiated adsorption characteristics allow taking account of the molecules present in the gas which have interacted with the receptors of the different sensitive surfaces.

Thus, in a detection system with an SPR or MZI technology, the analytes present in a fluid sample are brought to interact by adsorption/desorption with receptors located in one or more distinct sensitive surface(s) located for example in a measuring chamber. This then involves detecting in real-time an optical signal, associated with each of the sensitive surfaces, representative of the variation of a local refractive index over time due to the adsorption/desorption interactions of the analytes with the receptors.

FIG. 1 illustrates an interferometric detection system 1 of the MZI technology according to an example of the prior art, herein as described in the document EP3754326A1. The interferometric detection system 1 includes a laser source 2, an optical splitter, a Mach-Zehnder interferometer array 20, and photodetectors 6 each coupled to an interferometer 20. In this example, the laser source 2, the array of interferometers 20 and the photodetectors 6 rest on a photonic chip 10.

Each interferometer 20 includes two spiral-like waveguides 22, symmetrical to one another according to a longitudinal axis Z. One of the waveguides is covered by receptors with which the analytes are able to interact by adsorption/desorption. These receptors form a sensitive surface 30, and the considered waveguide is then so-called the sensitive arm 22*s*. The other waveguide is not covered by the receptors, and then forms the reference arm 22*r*.

The presence of analytes adsorbed on the sensitive surface 30 of the sensitive arm 22*s* modifies the properties of the guided optical mode crossing it, and more specifically causes a modification of the phase of the guided optical mode, while the phase of the guided mode crossing the reference arm 22*r* is substantially not modified. The phase difference between the signals received by the output coupler is reflected by a modification of the intensity of the optical signal recombined and detected by the photodetector 6, because of constructive or destructive interferences between the optical signals crossing the two arms 22.

It is important to reduce the size of the Mach-Zehnder interferometer array, and that being so to reduce the total surface area of the photonic chip and therefore reduce the costs.

One possibility then consists in arranging the Mach-Zehnder interferometers into an array having several lines and columns, as described in the article by Densmore et al., entitled *Silicon photonic wire biosensor array for multiplexed real-time and label-free molecular detection*, Opt. Lett. Vol. 34, No. 23, 3598 (2009). In this example, the interferometers have a rectangular periodic arrangement, and are aligned in columns according to a longitudinal axis passing between the waveguides of each Mach-Zehnder interferometer, and in lines according to a transverse axis orthogonal to the longitudinal axis.

However, there is a need for reducing the size of the Mach-Zehnder interferometer array, yet without degrading the performances of the interferometric detection system.

DISCLOSURE OF THE INVENTION

An objective of the invention is to overcome at least part of the drawbacks of the prior art, and more particularly to provide an interferometric detection system including a Mach-Zehnder interferometer array whose size is reduced and wherein the performances of the interferometric system are preserved, in particular when the sensitive surfaces include different receptors from one sensitive surface to another.

For this purpose, an object of the invention is an interferometric system for detecting analytes present in a fluid sample, including:

a Mach-Zehnder interferometer array, intended to be coupled on the one hand to at least one laser source and, on the other hand, to a plurality of photodetectors, each interferometer including two waveguides forming the arms of the interferometer, the arms extending in a spiral and/or serpentine fashion with an aspect ratio equal to 1 (one), the interferometers being arranged periodically and rectangularly, and aligned in columns according to a longitudinal axis passing between the arms of each interferometer, and in lines according to a transverse axis orthogonal to the longitudinal axis; and an array of sensitive surfaces each formed of receptors with which the analytes are able to interact by adsorption/desorption, each sensitive surface at least partially covering one amongst the arms of an interferometer which then forms a sensitive arm and not covering the other arm which then forms a reference arm.

According to the invention, the sensitive surfaces are arranged periodically and hexagonally, so that each of the sensitive surfaces of the same line is positioned on the same side of the longitudinal axis passing between the two arms of the considered interferometer, the positioning side of the sensitive surfaces with respect to the interferometers of the same column then alternating from one line to another.

Some preferred yet non-limiting aspects of this interferometric detection system are as follows.

The sensitive surfaces of the same hexagon may include three sensitive surfaces aligned according to the transverse axis.

Sensitive surfaces may include different receptors in terms of chemical and/or physical affinity compared to those of the adjacent sensitive surfaces.

The interferometric system may include input waveguides intended to couple the laser source to each interferometer, and output waveguides intended to couple each interferometer to the photodetectors, the input and output waveguides extending according to the transverse axis between each line of interferometers.

The arms of the same line may be spaced apart from those of the adjacent line(s) by a constant longitudinal spacing $e_l$ from one line to another, and the arms of the same column may be spaced apart from those of the adjacent column(s) by a constant transverse spacing $e_t$ from one column to another.

The arms may be made based on silicon and are surrounded by a cladding with a low refractive index (compared to the refractive index of the arms) made of an oxide.

A cladding of the arms may be formed by a lower layer and by an upper layer, the upper layer having an indentation at each sensitive arm.

The arms may be made of a silicon nitride and be covered with a thin adhesion layer made of an oxide on which the receptors are fixed, the thin adhesion layer being located in the indentation. Preferably, the thin adhesion layer is a deposited layer rather than a native oxide.

Organosilanes can be grafter over the thin adhesion layer thereby forming reactive groups to which the receptors are bonded.

The invention also relates to a method for manufacturing an interferometric system according to any one of the preceding features, including a step of depositing the microdrops containing receptors, opposite the arms intended to form the sensitive arms, the deposited microdrops having a dimension $d_g$ in a plane parallel to the array of interferometers, and the deposition of the microdrops having a non-zero positioning uncertainty $\Delta p_g$, the arms intended to become sensitive arms then being spaced apart in pairs by a distance at least equal to $d_g+2\times\Delta p_g$.

BRIEF DESCRIPTION OF THE DRAWINGS

Other aspects, aims, advantages and features of the invention will appear better upon reading the following detailed description of preferred embodiments thereof, given as a non-limiting example, and made with reference to the appended drawings, wherein.

Figure 4A:
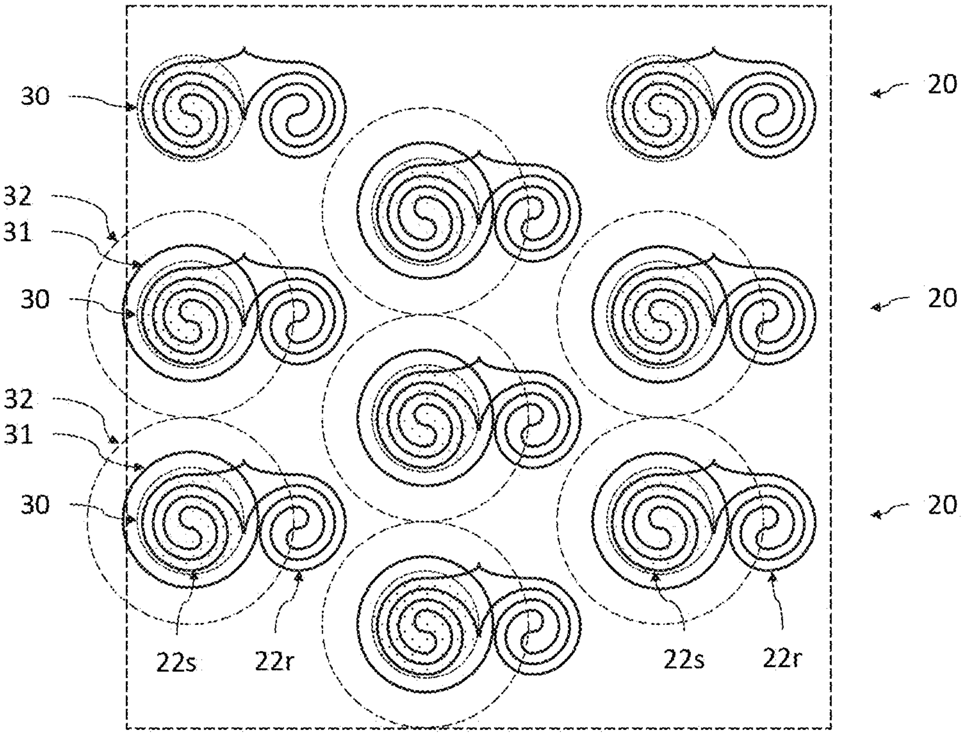
Figure 4B:
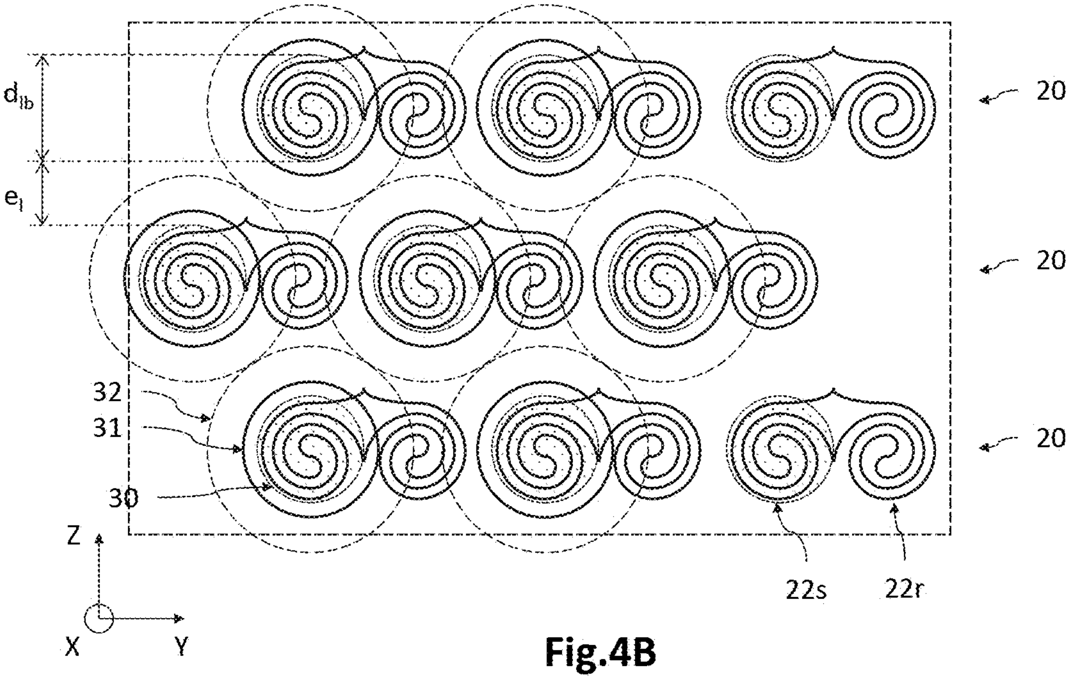
Figure 5:
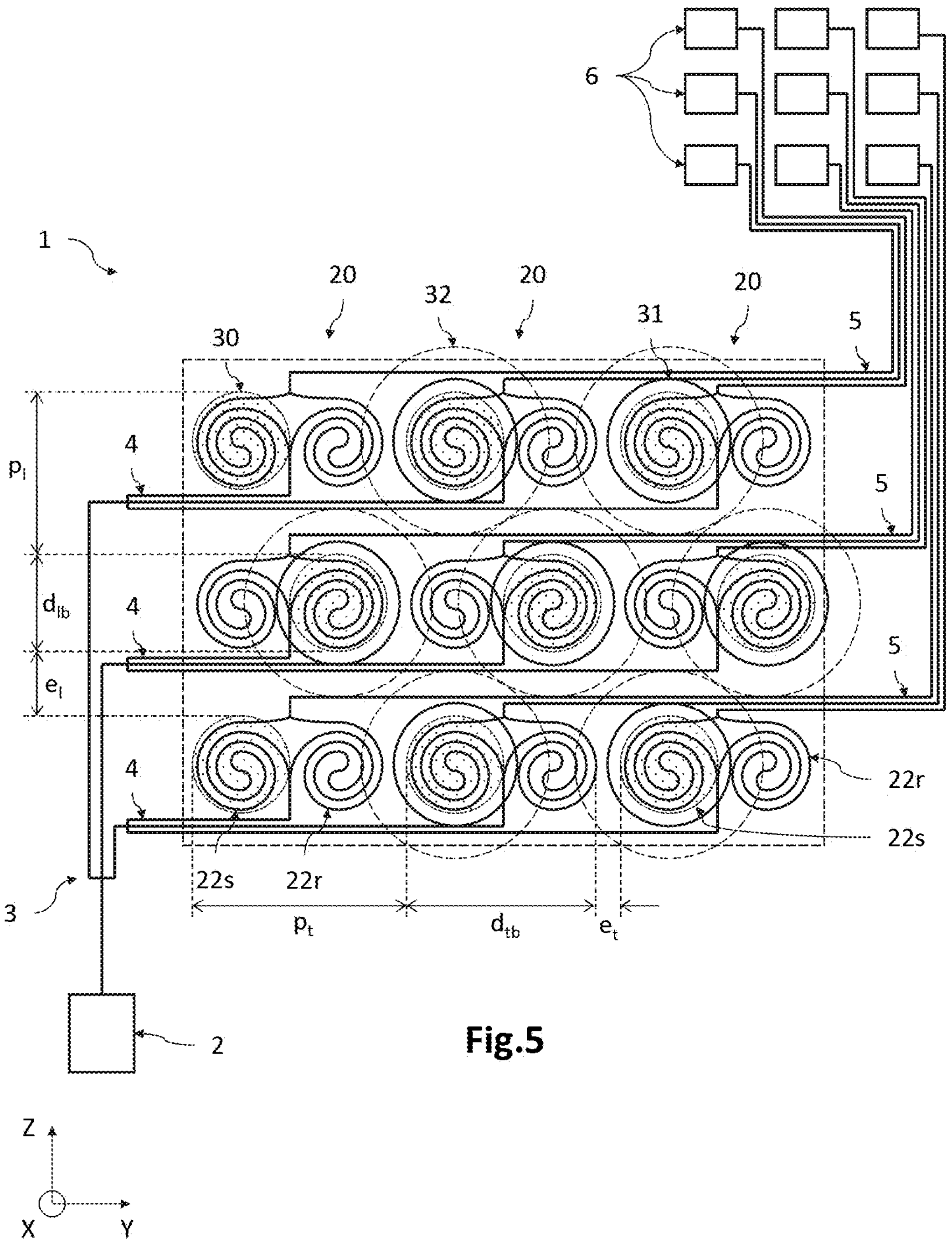
Figure 6:
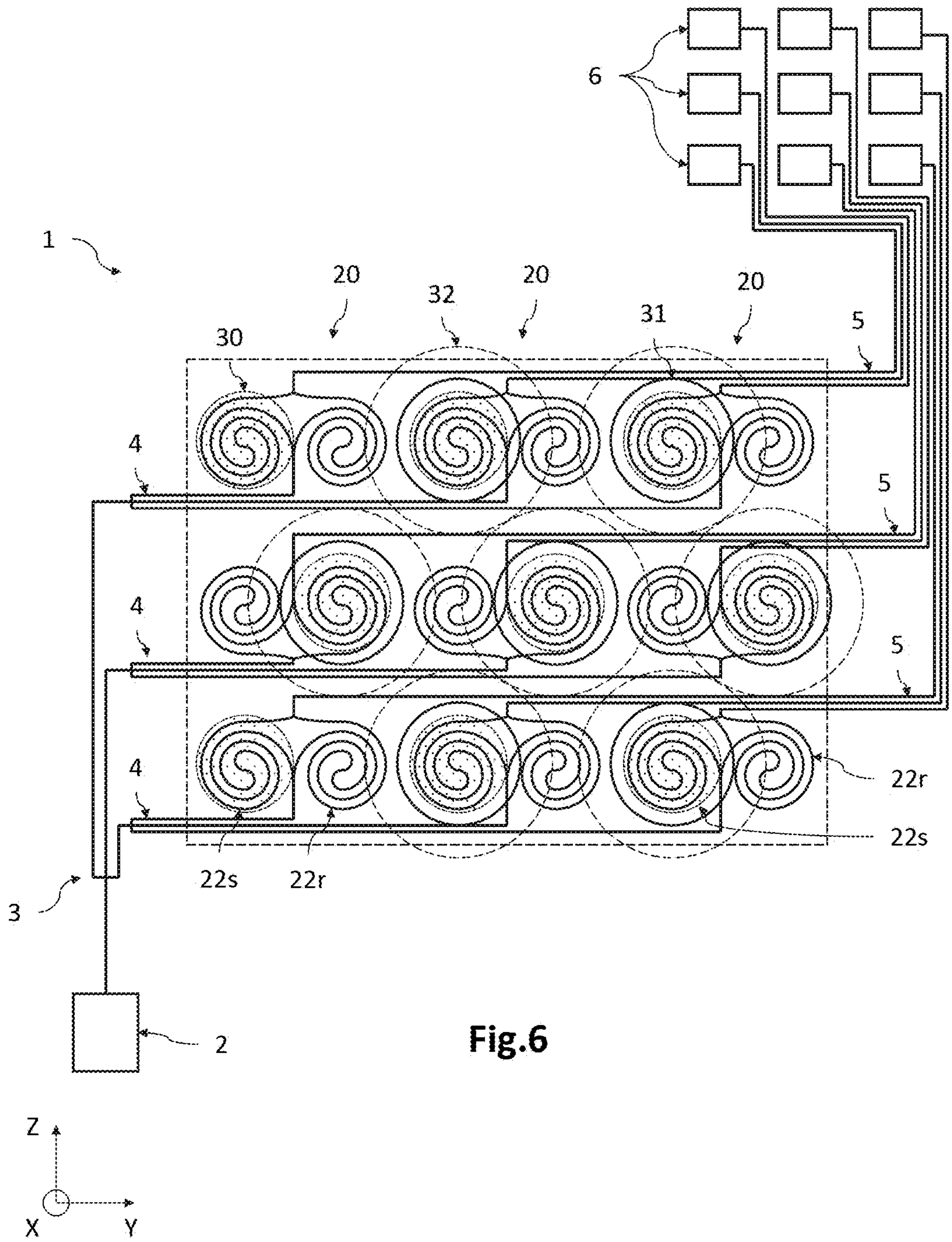

- in top view, the waveguides of a Mach-Zehnder interferometer and a microdrop containing receptors intended to form the sensitive surface, and
- in a cross-sectional view, the photonic chip with the waveguides of the Mach-Zehnder interferometer and the microdrop;

FIG. 4A is a top view of another Mach-Zehnder interferometer array, wherein these have a hexagonal periodic arrangement directed according to the longitudinal axis Z;

FIG. 4B is a top view of another Mach-Zehnder interferometer array, wherein these have a hexagonal periodic arrangement directed according to the transverse axis Y;

FIG. 5 is a schematic and partial top view of an interferometric detection system according to one embodiment;

FIG. 6 is a schematic and partial top view of an interferometric detection system according to one variant.

DETAILED DISCLOSURE OF PARTICULAR EMBODIMENTS

In the figures and in the following description, the same references represent identical or similar elements. In addition, the different elements are not plotted to scale so as to favor clarity of the figures. Moreover, the different embodiments and variants are not exclusive of one another and could be combined together. Unless stated otherwise, the terms "substantially", "about", "in the range of" mean within a 10% margin, and preferably within a 5% margin. Moreover, the terms "comprised between . . . and . . . " and the same mean that the bounds are included, unless stated otherwise.

The invention generally relates to the detection and characterization of analytes present in a fluid (gaseous or liquid) sample to be analyzed. The detection is performed by means of an interferometric detection system which generally includes: a laser source, a photonic chip containing a Mach-Zehnder interferometer array and sensitive surfaces containing receptors, and a plurality of photodetectors. In order to characterize the detected analytes, it further includes a processing unit.

The interferometric detection system uses the Mach-Zehnder interferometric technology (MZI). Only one of the two waveguides that form the arms of the Mach-Zehnder interferometer is covered by a sensitive surface containing receptors with which the analytes are able to interact by adsorption and desorption. This waveguide then forms the sensitive arm while the other waveguide forms the reference arm. The latter is optically isolated from the external medium and therefore from the fluid sample containing the analytes. As mentioned before, the intensity of the optical signal detected by the photodetector depends on the value of the effective index of the optical mode crossing the sensitive arm, which is representative of the interactions between the analytes and the receptors.

Analytes are elements present in a fluid sample and intended to be detected and characterized by the interferometric detection system. For illustration, they may consist of bacteria, viruses, proteins, lipids, volatile organic molecules, inorganic compounds, inter alia. Moreover, the receptors (ligands) are elements that cover one amongst the waveguides of the Mach-Zehnder interferometer (the sensitive arm) and have an ability to interact with the analytes, although the chemical and/or physical affinities between the analytes and the receptors are not necessarily known. Preferably, the receptors of the different sensitive surfaces have different physico-chemical properties, which affect their ability to interact with the analytes. As examples, these may consist of amino acids, peptides, nucleotides, polypeptides, proteins, organic polymers, inter alia.

In general, by characterization, it should be understood obtaining information representative of the interactions of the analytes contained in the fluid sample with the receptors of the sensitive surface(s) of the interferometric system detection. The considered interactions herein consist of events of adsorption and/or desorption of the analytes with the receptors. Thus, this information forms an interaction pattern, in other words a "signature" of the analytes, this pattern could be represented for example in the form of a histogram or of a radar chart. More specifically, in the case where the interferometric detection system includes K distinct sensitive surfaces, the interaction pattern is formed by the K pieces of scalar or vector representative information, these being derived from the measurement signal associated with the considered sensitive surface.

Figure 1:
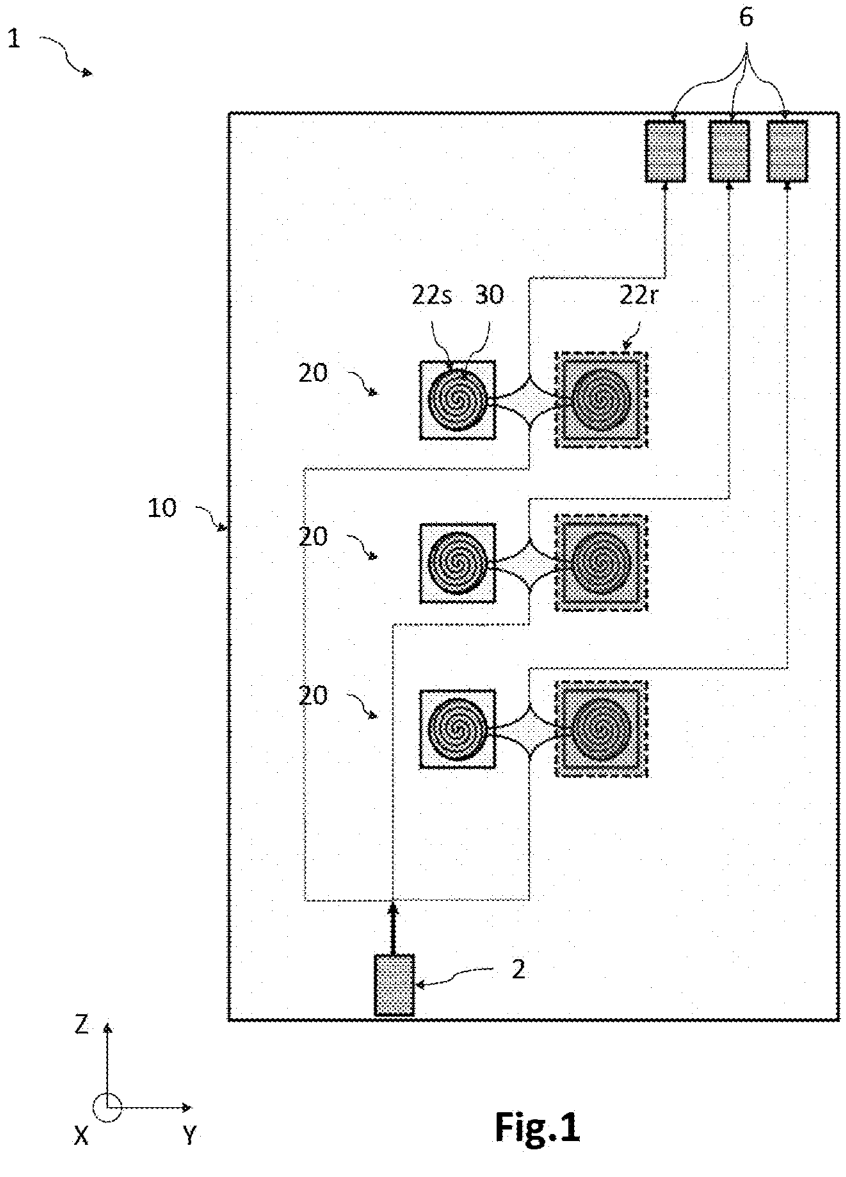
FIG. 1, already described, is a schematic and partial top view of an interferometric detection system according to an example of the prior art.
Figure 2:
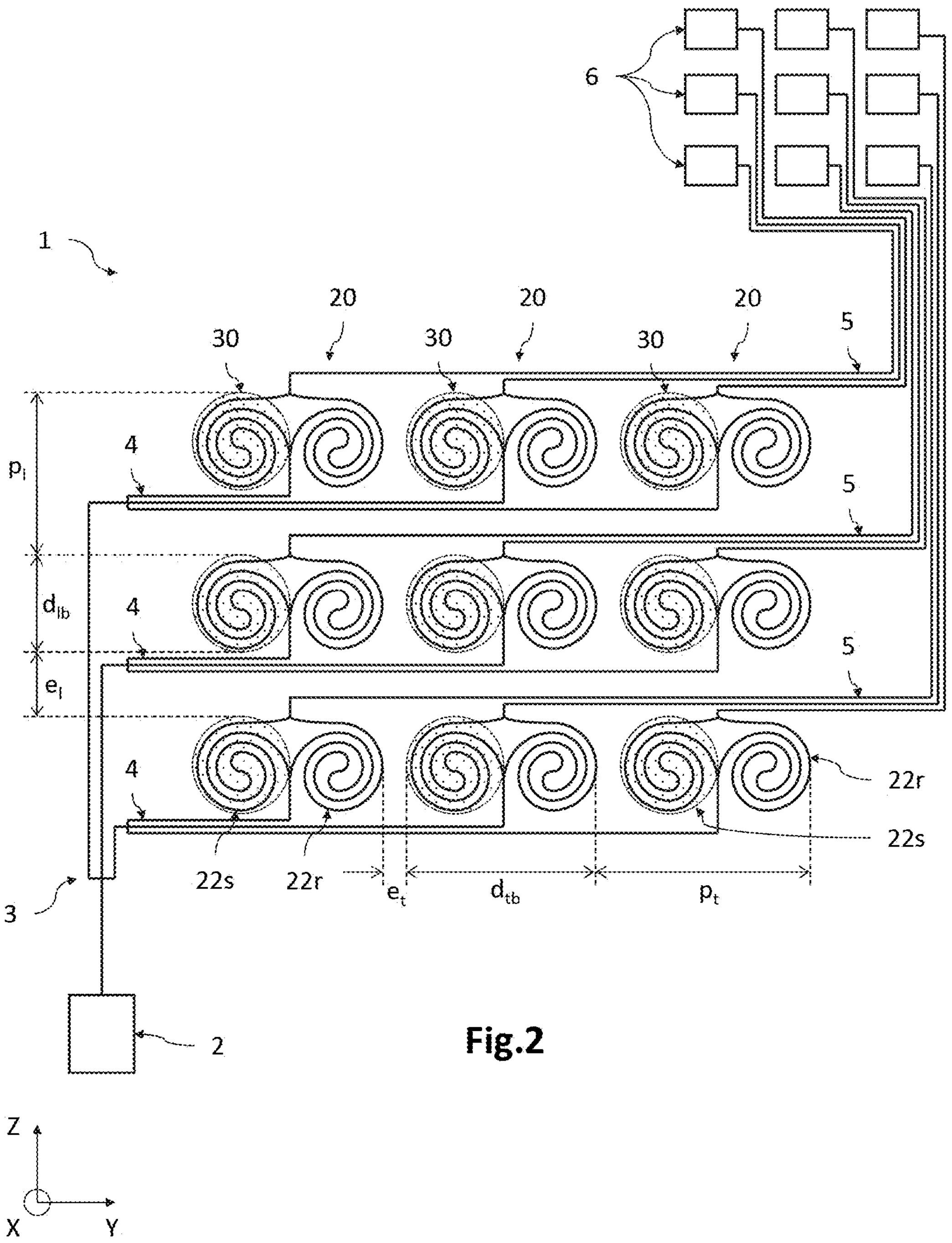
FIG. 2 is a schematic and partial top view of an example of an interferometric detection system.

FIG. 2 is a schematic and partial top view of an example of an interferometric detection system 1. In general, an interferometric detection system 1 includes: at least one laser source 2; a photonic chip 10 (cf. FIG. 3B) including a Mach-Zehnder interferometer array 20; and a plurality of photodetectors 6.

The laser source 2 and the photodetectors 6 may be located on or in the photonic chip 10, as illustrated in FIG. 2, or may be offset and coupled thereto by optical couplers (diffraction gratings, etc.).

An orthogonal three-dimensional direct reference frame XYZ is defined herein and for the following description, where the YZ plane is parallel to the main plane of the photonic chip 10, the X axis is a vertical axis, and where, for each interferometer 20, the longitudinal Z axis passes between the two arms 22, and the transverse Y axis is parallel to an axis passing through the center of the arms 22. The terms "upstream" and "downstream" refer to an increasing positioning depending on the direction of propagation of the optical signal.

The laser source 2 is an optical source of coherent light of a continuous and monochromatic signal, with a predefined wavelength, for example located in the near-infrared. It may be a vertical cavity surface emitting laser (VCSEL) source, a III-V/Si type hybrid laser source, or any other type of laser source. As indicated before, it may be assembled to or integrated with the photonic chip, or may be remote.

The photonic chip 10 is an optoelectronic component containing an integrated photonic circuit, and more specifically herein containing an array of Mach-Zehnder interferometers 20.

Figure 3A:
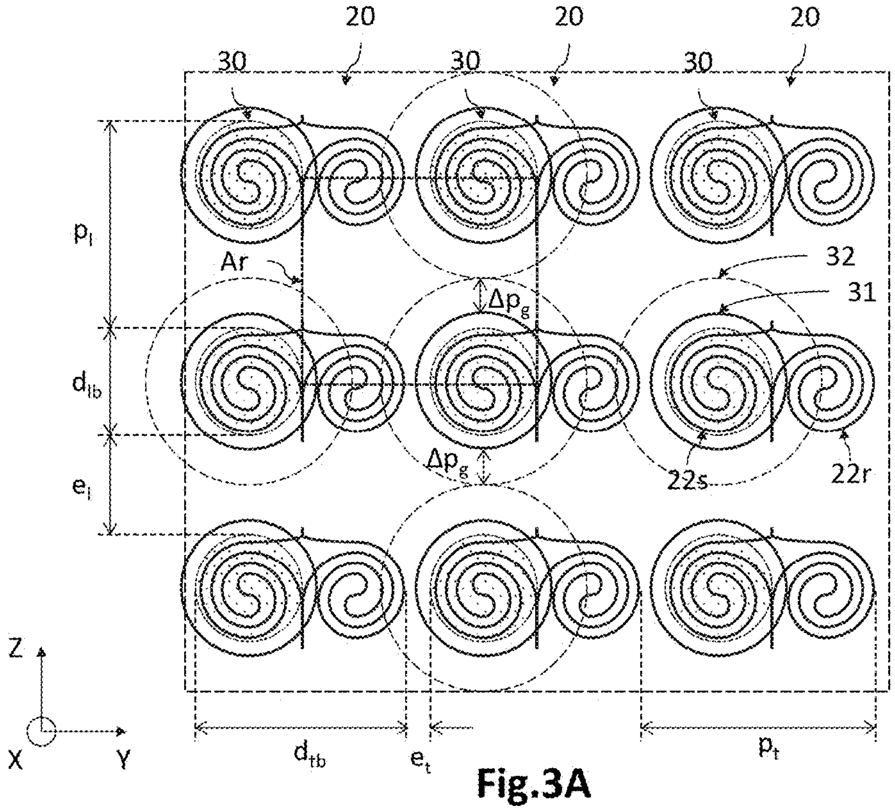
FIG. 3A is a top view of the Mach-Zehnder interferometer array of the interferometric system of the FIG. 2.
Figure 3B:
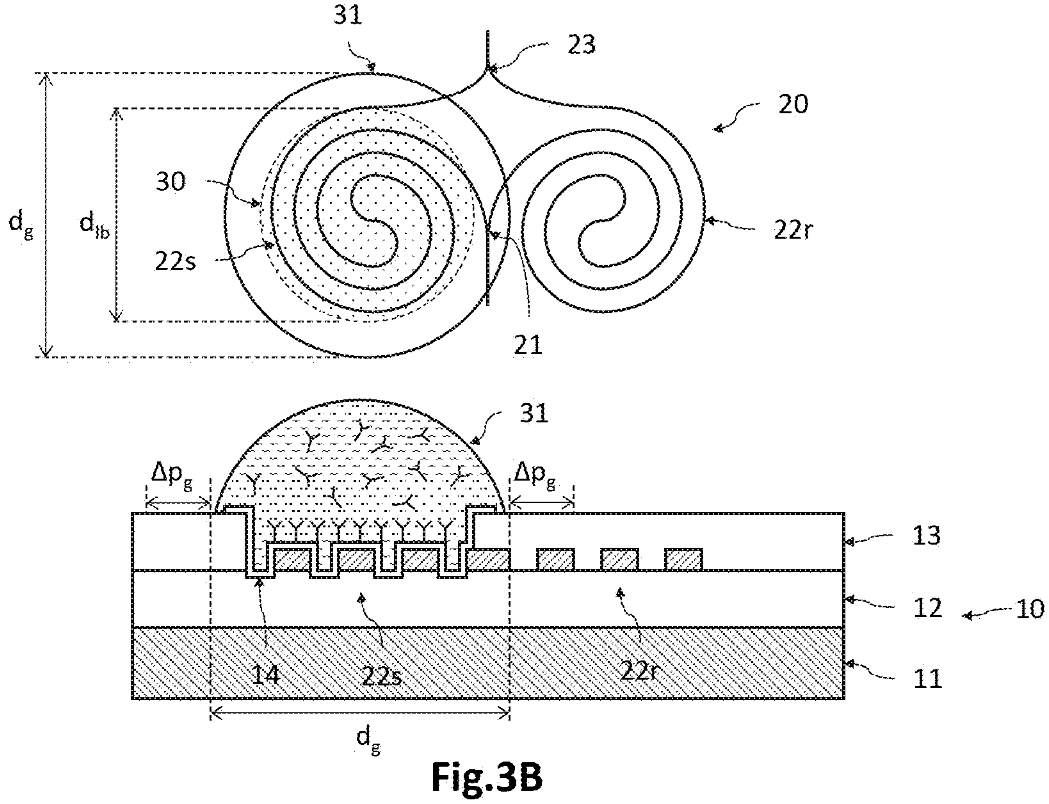
FIG. 3B illustrates in more detail a portion of the array of FIG. 3A, and more specifically.

As illustrated in FIG. 3B described in detail later on, it includes a support layer 11, for example made of silicon or glass, on which the waveguides 22 of the interferometers 20 rest. The waveguides 22 are formed by a core with a high refractive index surrounded by a cladding with a low index. In this example, the core is made of silicon (for example made of silicon or of a silicon nitride) and the cladding is herein formed by a lower layer 12 and an upper layer 13 made of a silicon oxide.

The Mach-Zehnder interferometer array 20 includes an optical splitter 3 coupled to the laser source 2, which splits the optical signal emitted by the laser source 2 and directs it towards the N×M interferometers 20 by input waveguides 4. In this respect, the array of interferometers 20 includes N rows and M columns, with N>1 and M>1. In this example, for merely illustrative purposes, the array has 3×3 dimensions, but it may include a larger number of interferometers 20, for example 8×8 or more.

Afterwards, each of these Mach-Zehnder interferometers 20 is coupled to an output waveguide 5 which transmits the optical signal in the direction of one of the N×M photodetectors 6. As indicated before, the photodetectors 6 may rest on the photonic chip 10 or may be offset. Alternatively, each interferometer 20 may be coupled to K output waveguides 5, so that the optical signal is transmitted to at least one amongst the N×M×K photodetectors.

Each interferometer 20 is of the Mach-Zehnder type and therefore includes two waveguides 22 which form the arms of the interferometer 20. As illustrated more clearly in FIG. 3B, a Mach-Zehnder interferometer 20 includes an input splitter 21, two distinct arms 22 coupled to the input splitter 21, and an output coupler 23 combining the optical signals crossing the two arms 22. Afterwards, the recombined optical signal circulates in the output waveguide 5 up to the corresponding photodetector 6.

The arms 22 of the Mach-Zehnder interferometers 20 herein consist of arms that extend in a spiral and/or serpentine fashion with an equal aspect ratio within a 1 to 20% margin, and preferably within a 10% margin, and even more preferably within a 1% margin. A waveguide is so-called a spiral-like waveguide when it is wound on itself between the input splitter 21 and the output coupler 23: it therefore includes a first portion which approaches a fixed point followed by a second portion which extends away therefrom. Moreover, a waveguide is so-called a serpentine-like waveguide when it extends in a given direction while featuring undulations.

Each spiral and/or serpentine like arm 22 has an aspect ratio equal to 1 in the XY plane within a 20% margin or less. Hence, an arm 22 includes an upstream portion for connection with the input splitter 21, a central spiral and/or serpentine like portion as such, and a downstream portion for connection with the output coupler 23. The spiral and/or serpentine like central portion has a maximum dimension denoted $d_{lb,1}$ (for example, the length) according to any first axis of the XY plane and a dimension denoted $d_{lb,2}$ (for example, the width) according to a second axis of the XY plane orthogonal to the first axis. The dimensions $d_{lb,1}$ and $d_{lb,2}$ are equal to one another within a 20% margin or less. In this example where the arms 22 have a circular spiral shape, the dimensions $d_{lb,1}$, $d_{lb,2}$ are denoted dib in the figures. Moreover, the central spiral and/or serpentine like portion may have a substantially circular or polygonal general shape in the XY plane.

As indicated later on, the Mach-Zehnder interferometer array 20 is arranged in lines according to the transverse axis Y and in columns according to the longitudinal axis Z. The arms 22 of each Mach-Zehnder interferometer 20 are arranged on either side of the longitudinal axis Z which forms an axis of symmetry.

The Mach-Zehnder interferometers 20 are arranged in a rectangular periodic manner meaning that four interferometers 20 adjacent to one another are arranged at the corners of the same rectangle (cf. the rectangle in dotted lines denoted Ar in FIG. 3A). The interferometers 20 of each row are aligned according to the transverse axis Y and have a periodicity step $p_t$, and those of each column are aligned according to the longitudinal axis Z and have a step $p_l$.

The arms 22 of an interferometer 20 are spaced apart according to the transverse axis Y from those of an neighboring interferometer 20 by a non-zero distance $e_t$, and are spaced apart according to the longitudinal axis Z from those of a neighboring interferometer 20 by a non-zero distance $e_l$. The transverse spacing $e_t$ and/or the longitudinal spacing $e_l$ have a sufficient value to enable the passage of the input waveguides 4 (connecting the optical splitter 3 to an interferometer 20) and the passage of the output waveguides 5 (connecting the interferometer 20 to the photodetector 6).

For example, for a Mach-Zehnder interferometer 20 having a longitudinal dimension $d_{lb}$ equal to about 150 μm and a transverse dimension $d_{tb}$ equal to about 300 μm, the transverse spacing $e_t$ may be equal to about 30 μm and the longitudinal spacing $e_l$ may be equal to about 140 μm. Also, the transverse step $p_t$ is equal to about 330 μm and the longitudinal step $p_l$ is equal to about 290 μm. The array then has a total surface area equal to $N \times p_l \times M \times p_t$. In this example where the array has a 3×3 dimension, the total surface area is 0.8613 $mm^2$.

The interferometric detection system 1 also includes an array of sensitive surfaces 30. A sensitive surface 30 is a surface of the photonic chip 10 which extends in the XY plane and which is formed of receptors with which the analytes are able to interact by adsorption/desorption.

Each sensitive surface 30 is located so as to at least partially cover one amongst the arms 22 of a Mach-Zehnder interferometer 20 which then forms the sensitive arm **22*s*, the second arm 22 not being covered by these receptors and then forms the reference arm 22*r*. The reference arm 22*r*** is optically isolated from the environment and therefore from the fluid sample containing the analytes.

The sensitive surfaces 30 are spatially distinct from one another. They include receptors which may be different from one sensitive surface 30 to another in terms of chemical or physical affinity with respect to the analytes to be characterized and are therefore intended to provide different interaction information from one sensitive surface 30 to another. Nonetheless, the interferometric detection system 1 may include several identical sensitive surfaces 30, for example in order to detect a possible measurement shift and/or to enable the identification of a defective sensitive surface 30.

In this example, the sensitive surfaces 30 have a circular shape (the arms 22 herein have a circular spiral like shape) and have a longitudinal dimension herein substantially equal to that of the spiral-like arms 22. Also, the longitudinal dimension $d_{lb}$ is herein that of the spiral-like arms 22 as well as that of the sensitive surfaces 30.

Moreover, the sensitive surfaces 30 are arranged in a rectangular periodic manner, like the arrangement of the Mach-Zehnder interferometers 20. Thus, the sensitive surfaces 30 also feature an alignment according to the transverse axis Y and have a periodicity step $p_t$, and an alignment according to the longitudinal axis Z and have a step $p_l$. In other words, the sensitive surfaces 30 are all located on the same side of the longitudinal axis Z, and herein cover the left-side waveguide (direction −Y) of each Mach-Zehnder interferometer 20.

The core of the sensitive arm **22*s* is located at a depth with respect to the sensitive surface 30, and therefore of the receptors, such that the optical signal propagating therein has an effective index which depends on the amount of material deposited in the sensitive surface 30, and therefore on the interactions between the analytes and the receptors. In this respect, as illustrated in FIG. 3B, the upper layer 13 of the cladding may be locally etched to clear at least the upper face of the sensitive arm 22*s* and thus form an indentation, while it is not etched at the reference arm 22*r*. A thin adhesion layer 14** may be deposited locally at the sensitive arm in the indentation thus formed, to facilitate fixation (grafting) of the receptors.

It should be recalled that the effective index of a guided mode is defined as the product of the propagation constant β and of λ/2π, λ being the wavelength of the optical signal. The propagation constant β depends on the wavelength λ and on the mode of the optical signal, as well as the properties of the waveguide (refractive indices and geometry). The effective index of the optical mode somehow corresponds to the refractive index of the waveguide 'viewed' by the optical mode. It is usually comprised between the index of the core and the index of the cladding. Hence, it should be understood that the amount and type of receptors and of analytes adsorbed in the sensitive surface modify the properties of the optical mode and/or of the waveguide, and therefore the phase of the guided mode.

Hence, the result is that the presence of analytes adsorbed on the sensitive surface 30 of the sensitive arm **22*s* modifies the properties of the guided optical mode crossing it, and more specifically causes a modification of the phase of the guided optical mode, while the phase of the guided mode crossing the reference arm 22*r* is substantially not modified. The phase difference between the signals received by the output coupler 23 is reflected by a modification of the intensity of the optical signal recombined and detected by the photodetector 6, because of constructive or destructive interferences between the optical signals flowing in the two arms 22**.

A processing unit (not illustrated) enables the implementation of the processing operations of a method for characterizing the analytes. In other words, based on the optical signals detected by the photodetectors, the processing unit determines a signature of the analytes which allows characterizing them. For this purpose, it is coupled to the photodetectors, and may include at least one microprocessor and at least one memory. It includes a programmable processor capable of executing instructions recorded on an information recording medium. It further includes at least one memory containing the instructions necessary for the implementation of the characterization method. The memory is also adapted to store the information calculated at each measurement time point.

FIG. 3A is a top view of the Mach-Zehnder interferometer array 20 illustrated in FIG. 2 and illustrates some microdrops 31 deposited over the photonic chip 10 in order to make the sensitive surfaces 30. FIG. 3B consist of top and sectional views of a sensitive surface 30, a microdrop 31, and the arms 22 of a Mach-Zehnder interferometer 20.

The method for manufacturing the interferometric detection system 1 includes a step of making the sensitive surfaces 30. For this purpose, following the localized etching of the upper layer 13 at the sensitive arm **22*s*, microdrops 31 are deposited in the areas of the photonic chip 10 intended to become the sensitive surfaces 30**.

The microdrops 31 are formed of a solvent containing the desired receptors. They are deposited collectively or one-by-one, by means of a microdrop deposition mechanism (not illustrated). When they are deposited over the photonic chip 10, they have a dimension in the XY plane denoted dg, which is larger than or equal to the dimension $d_{lb}$ of the spiral-like arms 22 (and of the sensitive surfaces 30 to be formed).

In this example, the waveguides are made based on a silicon nitride, for example of $Si_3N_4$, and the thin adhesion layer 14 is made of an oxide, for example made of an oxide of silicon, aluminum, hafnium, inter alia. It has a thickness in the range of a few nanometers to a few ten nanometers, for example equal to 10 nm. It should be noted that this thin adhesion layer 14 may be omitted when the material of the waveguides is suitable for ensuring sufficient adhesion to the receptors.

This thin adhesion layer 14 herein enables an improved silanization. In other words, the thin adhesion layer 14 is modified by covalent grafting of organosilanes which form reactive groups immobilizing the receptors. An organosilane is an organo-functional compound of general formula $R_nSiX_{(4-n)}$ with n an integer comprised between 1 and 3 where R is a non-hydrolysable organic group bearing an interaction function with the receptors and X is a hydrolysable group.

Thus, the surface of the thin adhesion layer 14 is functionalized by grafting of the organosilanes which ensure the immobilization of the receptors (for example peptides). This silanization is optimized since it is reflected by a high density of active sites for bonding with the receptors (formed by organosilanes), and by a good homogeneity of this density of active sites on each sensitive surface 30. It also allows obtaining a good repeatability in making of the active surfaces 30 (in terms of density and homogeneity of the active sites for bonding with the receptors) during the manufacture of the interferometric systems.

For example, one could wish to use small-sized receptors, such as peptides whose size is in the range of 1 nm, in particular to detect small analytes. It is then desired that the receptors form a homogeneous and dense layer, for example in the range of $10^6$ peptides per $\mu m^2$, so that the analytes specifically bind to the sensitive surface 30 (via these peptides) and not in a non-specific manner. Yet, the silanization of such an adhesion layer 14 made of an oxide allows obtaining a particularly high density of active sites, in the range of 1 to 2 per $nm^2$, which allows subsequently immobilizing the receptors with the desired density and homogeneity.

The method for functionalizing the thin adhesion layer 14 (silanization) may be performed by gaseous route (bringing the surface of the layer 14 into contact with the organosilane compound evaporated in a vacuum chamber); or by liquid route (by immersing the surfaces to be functionalized in a solution of the organosilane compound diluted in an anhydrous organic solvent). Moreover, 3-glycidoxypropyltrimethoxysilane (GOPS) may be used to subsequently enable a direct reaction with amine groups of a receptor (originally present on the proteins); or as another example a silane having an alkyne termination (for example: O-(propargyl)-N-(triethoxysilylpropyl)carbamate), for grafting by cycloaddition of an azide-modified receptor (N3) (a technique so-called "click chemistry").

Afterwards, the microdrops 31 are held on the photonic chip 10 for enough time for the receptors to be fixed (grafting) to the waveguide of the sensitive arm **22*s*, and herein on the thin adhesion layer 14. During this duration, the microdrops 31 are located in an environment whose conditions (temperature, humidity level, etc.) limit or prevent evaporation thereof. At the end of this grafting step, the surface of the photonic chip 10** is cleaned and then dried.

However, it appears that the microdrop deposition mechanism 31 may have a non-zero positioning uncertainty $\Delta p_g$ in the XY plane. Thus, in FIG. 3A, the microdrops 31 are illustrated by a circle in solid train, and the possible positioning area 32 by a circle in dotted lines with a dimension $d_g+2\times\Delta p_g$ (in the following description, it is considered that two circles with a dimension $d_g+2\times\Delta p_g$ which touch each other correspond to microdrops which, nonetheless, cannot coalesce).

Hence, it is important that the microdrops 31 are sufficiently spaced apart from one another to avoid coalescence between two neighboring microdrops. Indeed, such a coalescence would be reflected by a defective making of the considered sensitive surfaces 30, and therefore by a degradation of the detection and characterization performances by the interferometric detection system 1.

However, it is desired to reduce the size related to the Mach-Zehnder interferometer array 20 (the used total surface area), in order to reduce the total surface area of the photonic chip 10 and thus reduce the associated costs.

It should then be understood that in order to reduce the size of the Mach-Zehnder interferometer array 20, one should ensure on the one hand that the microdrops 31 cannot coalesce, and on the other hand that the longitudinal $e_l$ and/or transverse $e_t$ spacing between the arms 22 of the Mach-Zehnder interferometers 20 are enough for the passage of the input 4 and output 5 waveguides.

FIGS. 4A and 4B are top views of two examples of Mach-Zehnder interferometer arrays 20, wherein the arrangement of the interferometers 20 and of the sensitive surfaces 30 is supposed to reduce the size of the array of interferometers 20 while ensuring that the risk of coalescence of the microdrops 31 is eliminated.

In the example of FIG. 4A, the Mach-Zehnder interferometers 20 and the sensitive surfaces 30 have an identical arrangement, namely herein a hexagonal periodic arrangement herein directed according to the longitudinal axis Z.

In other words, seven interferometers 20 are arranged at the vertices and at the center of a hexagon, three interferometers 20 of which are aligned according to the longitudinal axis Z. In addition, the sensitive surfaces 30 are arranged on the same side of the longitudinal axis Z, namely herein on the left side (direction −Y).

This arrangement does not form a regular hexagon since the length of the sides of the hexagon is not constant from one side to another. Thus, the adjacent interferometers 20 of the same column are spaced apart by a distance substantially equal to $d_g+2\times\Delta p_g$, and herein equal to 290 μm, while the distance separating two adjacent interferometers 20 from different columns is larger than $d_g+2\times\Delta p_g$ and is herein equal to 360 μm.

In any event, the result is that this arrangement of the Mach-Zehnder interferometers 20 and of the sensitive surfaces 30 does not result in an optimization of the size of the array of interferometers 20. Indeed, the total surface area (dotted rectangular line) of the array is larger than that of FIG. 2 by more than 15%, in particular because of the presence of non-useful empty areas. In addition, the interferometer lines 20 are no longer spaced apart from one another by a constant spacing $e_l$, so that this arrangement considerably complicates the possible arrangement of the input 4 and output 5 waveguides.

In the example of FIG. 4B, the Mach-Zehnder interferometers 20 and the sensitive surfaces 30 also have an identical arrangement, namely herein a hexagonal periodic arrangement. However, it is herein directed according to the transverse axis Y (three interferometers 20 of the hexagon are aligned according to the axis Y). The sensitive surfaces 30 are arranged on the same side of the longitudinal axis Z, namely herein on the left side (direction −Y).

This arrangement is neither a regular hexagon. Indeed, the adjacent interferometers 20 forming a side located on the same line are spaced apart from each other by a distance larger than $d_g+2\times\Delta p_g$, herein equal to 330 μm. And the interferometers 20 forming a side that passes from one line to another are spaced apart by a distance $d_g+2\times\Delta p_g$ herein equal to 290 μm.

In any event, however, the result that this arrangement of the interferometers 20 and of the sensitive surfaces 30 does not result in a real optimization of the size of the array of interferometers 20. Indeed, the total surface area of the array is smaller by just about 3% than that of FIG. 2, because of non-useful empty areas. Moreover, the interferometer lines 20 are spaced apart from one another by a constant spacing $e_l$ in the range of 90 μm (versus 140 μm in FIG. 2).

FIG. 5 is a schematic and partial top view of an interferometric detection system 1 according to an embodiment of the invention.

It differs from that of FIG. 2 essentially by the arrangement of the sensitive surfaces 30. Indeed, it appears that dissociating the periodic arrangement of the interferometers 20 from that of the sensitive surfaces 30 allows reducing the size of the Mach-Zehnder interferometer array while ensuring that the microdrops 31 cannot coalesce. In addition, the spacing between the lines and/or the columns of the interferometers 20 is sufficient to enable the passage of the input 4 and output 5 waveguides.

For this purpose, the Mach-Zehnder interferometers 20 are arranged in a rectangular periodic manner. They are aligned in lines according to the transverse axis Y and are aligned in columns according to the longitudinal axis Z. The transverse step $p_t$ is constant and is herein equal to about 330 μm. It is formed by the transverse dimension $d_{tb}$ of the arms (herein equal to about 300 μm) and the transverse spacing $e_t$ between the arms 22 of two adjacent interferometers 20 (herein equal to about 30 μm). In addition, the longitudinal step $p_l$ is constant and is herein equal to about 250 μm. It is formed by the longitudinal dimension $d_{lb}$ of the arms (herein equal to about 150 μm) and the longitudinal spacing $e_l$ between the arms 22 of two adjacent interferometers 20 (herein equal to about 100 μm).

In addition, the sensitive surfaces 30 are arranged in a hexagonal periodic manner according to the transverse axis Y. They are located at the six vertices and the center of the hexagon. The hexagon is directed according to the transverse axis Y meaning that three sensitive surfaces 30 of the hexagon (two vertices and the center) are located on the same line and are aligned according to the transverse axis Y.

This hexagonal periodic arrangement is reflected by the fact that the sensitive surfaces of the same line are positioned on the same side of the longitudinal axis Y passing between the two arms 22 of the considered interferometer 20, and that this positioning side changes from one line to another. In other words, the positioning side of the sensitive surfaces 30 with respect to the interferometers 20 of the same column alternates from one line to another. In this example, the sensitive surfaces 30 of the lower line are located opposite the left arm 22 (located according to the direction −Y), the sensitive surfaces 30 of the central line are located opposite the right arm 22 (located according to the direction +Y), and the sensitive surfaces 30 of the upper line are located opposite the left arm 22.

Thus, it appears that arranging the interferometers 20 in a rectangular manner allows avoiding the non-useful areas which are shown in FIGS. 4A and 4B. In addition, the hexagonal periodic arrangement of the sensitive surfaces 30 allows reducing the size of the array of interferometers since it is possible to reduce the spacings $e_l$ and/or $e_t$ while ensuring that the microdrops 31 cannot coalesce on the one hand, and that the passage of the input 4 and output 5 waveguides remains possible on the other hand. For illustration, the total surface area of the Mach-Zehnder interferometer array is smaller by about 14% than that of FIG. 2.

Particular embodiments have just been described. Different variants and modifications should appear to a person skilled in the art.

Thus, as illustrated in FIG. 6, the Mach-Zehnder interferometers 20 may have a symmetrical configuration from one line to another. In other words, for a given line, the interferometers 20 have the configuration of FIG. 5, and for the neighboring lines, the optical splitter 21 is located upstream of the center of the spiral-like arms 22 (according to the direction −Z) while the optical coupler 23 is located downstream of the center of the spiral-like arms 22 (according to the direction +Z). In any event, the arms 22 have a spiral and/or serpentine shape with an aspect ratio equal within a 1 to 20% margin.

The invention claimed is:

1. An interferometric system for detecting analytes present in a fluid sample, including:

a Mach-Zehnder interferometer array, adapted for coupling on the one hand to at least one laser source and on the other hand to a plurality of photodetectors, each interferometer including two waveguides forming arms of the interferometer, the arms extending in a spiral, serpentine, or both a spiral and serpentine, in a plane including a longitudinal axis and a transverse axis, aspect ratio of a maximum dimension of the arm in the longitudinal axis to a maximum dimension of the arm in the transverse axis being equal to 1+/−20%, the interferometers being arranged in a periodic rectangular array and aligned in columns according to the longitudinal axis and in lines according to the transverse axis;

an array of sensitive surfaces each formed of receptors with which the analytes are able to interact by adsorption, desorption, or both adsorption and desorption, each sensitive surface at least partially covering one amongst the arms of an interferometer which is a sensitive arm and not covering the other arm which is a reference arm;

wherein: the sensitive surfaces are arranged in a periodic hexagonal array, so that each of the sensitive surfaces along a line of the interferometers is positioned on a same respective side of a respective longitudinal axis passing between the two arms of each respective interferometer, the respective side of the sensitive surfaces alternating between adjacent lines of the interferometers.

2. The interferometric system according to claim 1, wherein the sensitive surfaces of the hexagonal array include three sensitive surfaces aligned along each line of the interferometers.

3. The interferometric system according to claim 1, wherein adjacent sensitive surfaces include different receptors in terms of chemical and/or physical affinity.

4. The interferometric system according to claim 1, including input waveguides adapted to couple the laser source to each interferometer, and output waveguides adapted to couple each interferometer to the photodetectors, the input and output waveguides extending according to the transverse axis between each line of the interferometers.

5. The interferometric system according to claim 1, wherein a plurality of the arms along the transverse axis are spaced apart from a plurality of the arms along a neighboring transverse axis by a constant longitudinal spacing $e_l$, and a plurality of the arms in a same column are spaced apart from those of an adjacent column by a constant transverse spacing $e_t$.

6. The interferometric system according to claim 1, wherein the arms are made based on silicon, and are surrounded by a cladding, made of an oxide, with a lower refractive index than the refractive index of the arms.

7. The interferometric system according to claim 6, wherein a cladding of the arms is formed by a lower layer and by an upper layer, the upper layer having an indentation at each sensitive arm, and wherein the arms are made of a silicon nitride, and are covered with a thin adhesion layer made of an oxide on which the receptors are fixed, the thin adhesion layer being located in an indentation.

8. The interferometric system according to claim 7, comprising organosilanes grafted to the thin adhesion layer and forming reactive groups to which the receptors are bonded.

9. The interferometric system according to claim 1, wherein a cladding of the arms is formed by a lower layer and by an upper layer, the upper layer having an indentation at each sensitive arm.

10. A method for manufacturing an interferometric system according to claim 1, including:

a step of depositing microdrops containing receptors opposite the arms that comprise the sensitive arms, the deposited microdrops having a dimension dg in a plane parallel to the interferometer array, and the deposition of the microdrops having a non-zero positioning uncertainty $\Delta p_g$, the arms that comprise sensitive arms then being spaced apart in pairs by a distance at least equal to $d_g+2\times\Delta p_g$.

* * * * *